United States Patent
Feit et al.

(10) Patent No.: US 10,481,757 B2
(45) Date of Patent: *Nov. 19, 2019

(54) EYE GAZE CONTROL SYSTEM

(71) Applicant: Honda Motor Co., Ltd., Tokyo (JP)

(72) Inventors: Steven Feit, Dublin, OH (US); Jason Lin, Redwood City, CA (US); Ross C. Miller, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 250 days.

This patent is subject to a terminal disclaimer.

(21) Appl. No.: 15/436,903

(22) Filed: Feb. 20, 2017

(65) Prior Publication Data

US 2017/0160908 A1   Jun. 8, 2017

Related U.S. Application Data (63) Continuation of application No. 13/670,906, filed on Nov. 7, 2012, now Pat. No. 9,626,072.

(51) Int. Cl.
*G06F 3/048* (2013.01)
*G06F 3/0481* (2013.01)
(Continued)

(52) U.S. Cl.
CPC .......... *G06F 3/04817* (2013.01); *G06F 3/013* (2013.01); *G06F 3/04842* (2013.01);
(Continued)

(58) Field of Classification Search
CPC ...... G06F 3/0481; G06F 3/0482; G06F 3/013; G06F 3/04883; G06F 3/0485;
(Continued)

(56) References Cited

U.S. PATENT DOCUMENTS 5,689,619 A   11/1997   Smyth
5,912,721 A   6/1999   Yamaguchi et al.
(Continued)

FOREIGN PATENT DOCUMENTS

| EP | 1562102 | 8/2005 |
|----|---------|--------|
| EP | 1607840 | 12/2005 |
| EP | 1679577 | 12/2006 |

OTHER PUBLICATIONS

Jacob, R.J.K.: "The Use of Eye Movements in Human-Computer Interaction Techniques: What You Look at Is What You Get", Naval Research Laboratory, ACM Transactions on Information Systems, vol. 9, No. 3, Apr. 1991, pp. 152-169.
(Continued)

*Primary Examiner* — Jeanette J Parker
(74) *Attorney, Agent, or Firm* — Rankin, Hill & Clark LLP (57) ABSTRACT

A system and method for controlling an electronic system is presented. An icon is displayed on a display. The icon is associated with a function of the electronic system and has an entrance zone about a center of the icon and an exit zone about the center of the icon. The exit zone is larger than the entrance zone. A location of a gaze of a user upon the display is detected using an eye gaze detection system. When the location of the gaze of the user is within the entrance zone, an indication that the icon is selected is presented. When the location of the gaze of the user is outside the exit zone, an indication that the icon is deselected is presented.

20 Claims, 8 Drawing Sheets

(51) Int. Cl.
*G06F 3/01* (2006.01)
*G06F 3/0484* (2013.01)

(52) U.S. Cl.
CPC .... *B60K 2370/12* (2019.05); *B60K 2370/193* (2019.05); *B60K 2370/21* (2019.05); *G06F 3/048* (2013.01)

(58) Field of Classification Search
CPC ................ G06F 3/048; G06K 9/00302; B60K 2370/193; B60K 2370/21; B60K 2370/12
See application file for complete search history.

(56) References Cited

U.S. PATENT DOCUMENTS

| | | |
|---|---|---|
| 6,295,049 B1 | 9/2001 | Minner |
| 6,323,884 B1 | 11/2001 | Bird et al. |
| 6,351,273 B1 | 2/2002 | Lemelson et al. |
| 6,456,262 B1 | 9/2002 | Bell |
| 7,429,108 B2 | 9/2008 | Rosenberg |
| 7,655,895 B2 | 2/2010 | Breed |
| 2003/0201895 A1 | 10/2003 | Harter et al. |
| 2005/0034081 A1 | 2/2005 | Yamamoto et al. |
| 2005/0047629 A1 | 3/2005 | Farrell et al. |
| 2005/0206583 A1 | 9/2005 | Lemelson et al. |
| 2005/0243054 A1 | 11/2005 | Beymer et al. |
| 2006/0256133 A1 | 11/2006 | Rosenberg |
| 2007/0164990 A1* | 7/2007 | Bjorklund ............... G06F 3/017 345/156 |
| 2010/0231504 A1 | 9/2010 | Bloem et al. |
| 2011/0109880 A1 | 5/2011 | Nummela |
| 2011/0111384 A1 | 5/2011 | Dietrich et al. |
| 2011/0309924 A1 | 12/2011 | Dybalski et al. |
| 2012/0019662 A1 | 1/2012 | Maltz |
| 2012/0169582 A1* | 7/2012 | Tschirhart ............. G02B 27/01 345/156 |
| 2012/0215403 A1 | 8/2012 | Tengler et al. |
| 2013/0063340 A1 | 3/2013 | Mondragon et al. |
| 2013/0097557 A1* | 4/2013 | Madau ..................... A61B 5/18 715/810 |
| 2013/0145304 A1 | 6/2013 | DeLuca et al. |
| 2013/0176202 A1* | 7/2013 | Gervautz ................ G06F 3/017 345/156 |

OTHER PUBLICATIONS

Ohno, T.: "Features of eye gaze interface for selection tasks", NTT Basic Research Laboratories, Atsugi, Kanagawa, Japan, IEEE Computer Society 1998 (Abstract only).

Tall, M.: "NeoVisus Gaze Interaction Interface Components", Master Thesis, Lund University, Sweden (Spring, 2008), 22 pages.

Sibert, L., et al.: "Evaluation of Eye Gaze Interaction", Human-Computer Interaction Lab, Naval Research Laboratory Washington DC, 8 pages.

Jacob, R.J.K., "Eye Movement-Based Human-Computer Interaction Techniques: Toward Non-Command Interfaces", Human-Computer Interaction Lab, Naval Research Laboratory, Washington, D.C., 58 pages.

Poitschke, T., et al.: "Gaze-based interaction on multiple displays in an automotive environment", Oct. 2011, IEEE, pp. 543-548.

International Search Report for related International Application No. PCT/IB2013/003081 dated Jun. 4, 2014, 4 pages.

\* cited by examiner

| Select a City | |
|---|---|
| 1 GALENA, OH | 43021 |
| 2 GAMBIER, OH | 43022 |
| 3 GRANVILLE, OH | 43023 |
| 4 HEBRON, OH | 43025 |
| 5 HILLIARD, OH | 43026 |
| 6 HOMER, OH | 43027 |

*FIG. 8C*

EYE GAZE CONTROL SYSTEM

BACKGROUND

The disclosure relates in general to a system and method for controlling an electronic system in communication with a vehicle and, more particularly, to a system and method for interacting with a vehicle human-machine interface (HMI) using gaze or eye tracking.

Many vehicles include user interfaces to allow a vehicle operator or passenger to control functions relating to the vehicle or other connected electronic systems, such as navigation, entertainment, or climate control systems. The user interfaces may include mechanical controls, such as button, knobs, dials, and the like, mounted into the vehicle's dashboard. Usually, these mechanical control interfaces are integrated with various displays that are used to provide information to the user.

Because the size of a vehicle's dashboard is limited, the mechanical control elements and any displays mounted therein share a limited amount of space. The space limitation restricts the amount of information that may be simultaneously displayed to the user. In addition, only a few control elements may be available to operate, where the control elements control a larger number of functions that may be offered to the user. Some vehicles, therefore, include a touch screen to simultaneously provide both device control interfaces and display functionality.

Both touch screen devices and conventional mechanical controls, though, require that the user physically interact with the device, either by manipulating a mechanical control device or touching a touch screen. These actions require that a vehicle driver take his or her hands off the steering wheel, possibly creating a dangerous situation.

In contrast to conventional control systems, eye gaze control systems provide an HMI that allows the user to interact with the vehicle without taking his or her hands off the vehicle's steering wheel. In general, the eye gaze control systems use one or more imaging devices or cameras in combination with an image processor to track the user's eyes and determine a direction in which the user is looking. The system then displays a number of icons on a screen. Each icon is associated with a particular device function.

The user interacts with the displayed icons by looking directly at a particular icon that is associated with a desired function. The eye gaze control system then determines at which one of the displayed icons the user is looking. That determination can then be used to perform a particular action associated with the icon. These eye gaze control systems, therefore, allow a user to interact with a display screen just by looking at a particular icon or image displayed on the screen.

Unfortunately, conventional eye gaze systems suffer from a number of deficiencies. A normal human eye is constantly moving, even when focused on a particular object. This movement or 'jitter' can make selecting a target icon on a display screen difficult. As the eye moves, the eye gaze control system may register that the eye is flickering back-and-forth, between being directed to the icon and not being directed to the icon. This causes the icon to flicker between being selected and not being selected. As a result, the jitter may cause the user to be unable to cause a particular target icon to be selected. Conversely, the jitter may result in the user accidentally selecting an unintended target icon.

Exacerbating this problem, many eye gaze control systems indicate that the user has selected a particular icon by displaying a border around the icon to demonstrate that the icon is selected. However, when the border is displayed, the user's eye will often move, sometimes subconsciously, to the edge of the icon to look at the newly-displayed border. Because the border is at the periphery of the icon, any natural jitter in the user's eye will cause the user's gaze to move outside of the icon, possibly causing the icon to be deselected. Even if this deselection is only temporary (as the jitter may cause the user's gaze to again be positioned over the icon), the icon will be temporarily deselected making it difficult for the user to control the eye gaze detection system.

BRIEF DESCRIPTION

The disclosure relates in general to a system and method for controlling an electronic system in communication with a vehicle and, more particularly, to a system and method for interacting with a vehicle human-machine interface (HMI) using gaze or eye tracking.

In one implementation, the present invention is a method for controlling an electronic system. The method includes displaying an icon on a display. The icon is associated with a function of the electronic system and has an entrance zone about a center of the icon and an exit zone about the center of the icon. The exit zone is larger than the entrance zone. The method includes detecting a location of a gaze of a user upon the display using an eye gaze detection system, when the location of the gaze of the user is within the entrance zone, indicating that the icon is selected, and, when the location of the gaze of the user is outside the exit zone, indicating that the icon is deselected.

In another implementation, the present invention is a method for controlling an electronic system. The method includes displaying an icon on a display. The icon has an entrance zone and an exit zone. The method includes detecting a location of a gaze of a user upon the display, when the location of the gaze of the user is within the entrance zone, selecting the icon, and, when the location of the gaze of the user is outside the exit zone, deselecting the icon.

In another implementation, the present invention is a system for controlling an electronic system. The system includes a display configured to display an icon. The icon has an entrance zone about the icon and an exit zone about the icon. The exit zone is larger than the entrance zone. The system includes an eye gaze detector configured to detect a location of a gaze of a user upon the display, and a processor connected to the display and the eye gaze detector. The processor is configured to, when the location of the gaze of the user is within the entrance zone, indicate that the icon is selected, and, when the location of the gaze of the user is outside the exit zone, and indicate that the icon is deselected.

DETAILED DESCRIPTION

The disclosure relates in general to a system and method for controlling an electronic system in communication with a vehicle and, more particularly, to a system and method for controlling a vehicle human-machine interface (HMI) using a gaze or eye detection system.

The present system and method is presented in several varying embodiments in the following description with reference to the Figures, in which like numbers represent the same or similar elements. Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Figure 6:
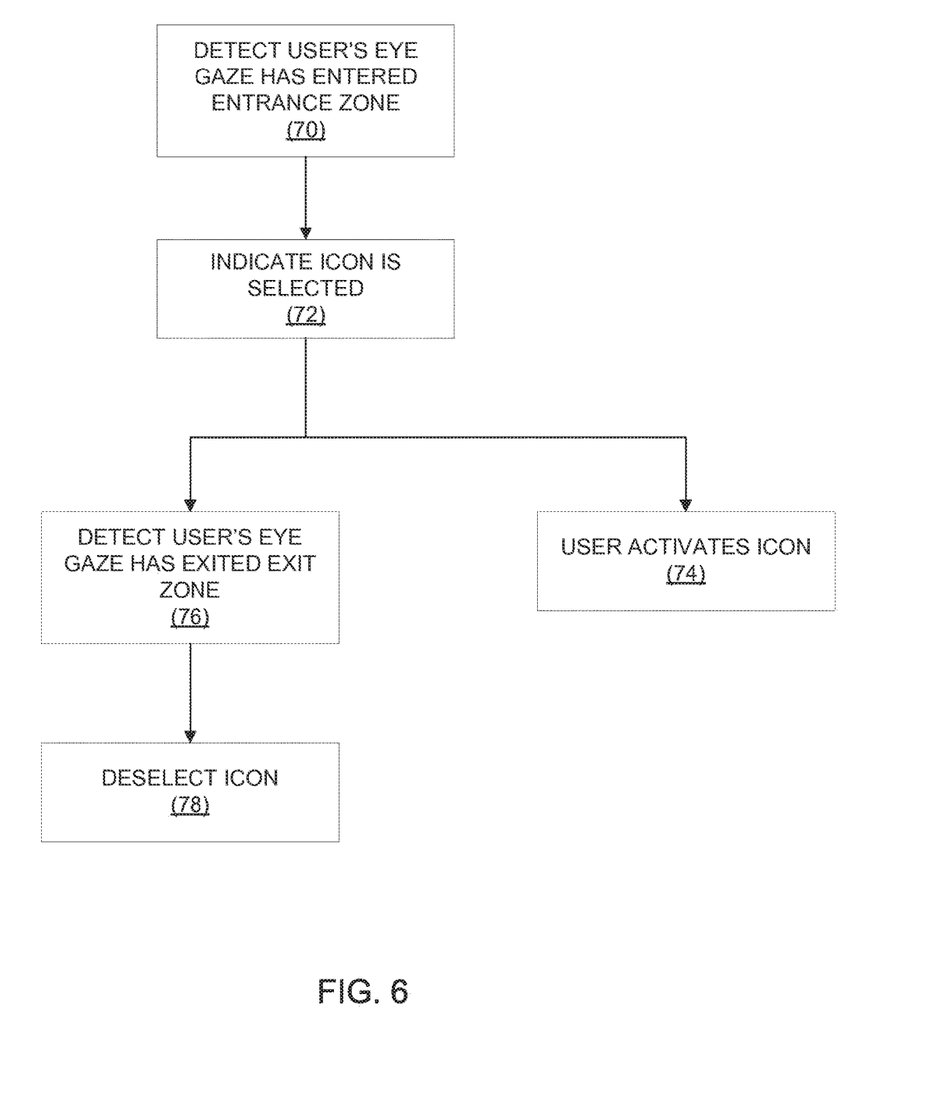
FIG. 6 is a flowchart showing an example method for controlling the selection and deselection of an icon.

The schematic flow chart diagrams included are generally set forth as logical flow-chart diagrams (e.g., FIG. 6). As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A number of eye gaze detection technologies allow for the tracking of a user's gaze. The systems, sometimes referred to as gaze-tracking or eye-tracking systems, generally operate by sensing the direction that a user is looking and thereby determining where upon a display unit the user's gaze is falling. The systems are fast enough to allow the location of the user's gaze to be tracked in real time as he or she scans an electronic display. In some cases, these gaze-tracking systems allow a user to control a cursor upon a computer screen based upon where on the screen he or she is looking at various points in time.

Figure 1:
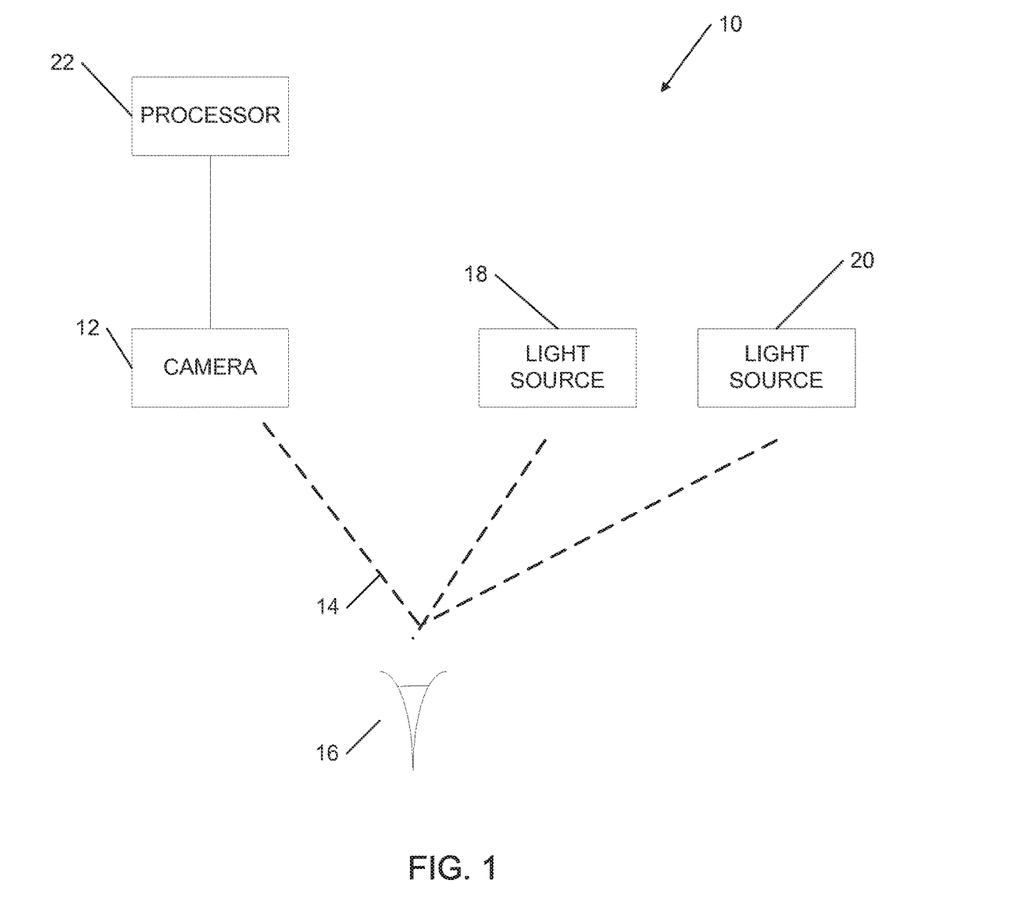
FIG. 1 is a block diagram showing functional components of an example eye gaze tracking system.

FIG. 1 is a block diagram showing functional components of an example eye gaze tracking system. System 10 includes camera 12 configured to acquire successive image frames at a specified rate. The camera captures light 14 reflected from a user's eye 16. The light is generated by two near-infrared time multiplexed light sources 18 and 20, each composed of a set of infrared (IR) light emitting diodes (LED's) synchronized with the camera frame rate. The system then tracks eye focus by detecting the reflection of the emitted light off the user's eyes. More specifically, one light source 18 is placed on or very close to the optical axis of the camera (note, this positioning is not shown in FIG. 1, which only shows the functional components of the system, not their geometrical positioning), and is synchronized with even frames. The second light source 20 is positioned away from the camera axis, and is synchronized with the odd frames. The two light sources are calibrated to provide approximately equivalent whole-scene illumination. When the on-axis light source is operated to illuminate a reader's eye, which has a pupil and a cornea, the camera is able to detect the light reflected from the interior of the eye, and the acquired image of the pupil appears bright. On the other hand, illumination from off-axis light source generates a dark pupil image. Pupil detection is achieved by processor 22, which receives imaging data from camera 12 and subtracts the dark pupil image from the bright pupil image. After thresholding the difference, the largest connected component is identified as the pupil.

After the pupil is detected, the location of the corneal reflection (the glint or point of light reflected from the surface of the cornea due to one of the light sources) is determined by processor 22 from the dark pupil image. A geometric computation is then performed by processor 22, using such information together with a known positional relationship between the gaze-tracking sensor system and the electronic display. The computation provides an estimate of a reader's point of gaze in terms of coordinates on the electronic display.

Alternatively, the present system may utilize a "dark eye" eye gaze tracking system. Such a system uses two (or more) IR illuminators and two (or more) IR spectrum cameras that are located a distance apart, making the cameras not coaxial. The system looks at the user's eye and the IR illuminators create two (or more) "glints" on the surface of the user's iris. These glints are used to calculate the curvature of the eye and are used as reference points from the fixed cameras and illuminators. The system then calculates the edge of the pupil, based on the contrast between the pupil and the iris and creates a circle based on this data. The system then calculates the center of that circle and uses the center of the eye that was calculated by using the glints on the surface of the eye. This creates a line that is used to calculate where the user is looking.

These are just examples of eye gaze detection or tracking systems. Other systems having different configurations of cameras and light emitting devices are known and can be used in conjunction with the present system and method. In general, any eye tracking system that is configured to estimate a direction of an individual's gaze may be used.

When utilized within a vehicle, the present system may include an IR spectrum camera, and an IR illumination source. The camera and illumination source operate as described above to track the eyes of the vehicle operator, or another individual using the system. The system includes a display that outputs a number of icons or menu items that are selectable by the user using gaze detection. In some implementations, the system also includes a conventional mechanical interface (e.g., a steering wheel-mount button) allowing the user to physically interact with the eye detection system. Using the button, the user, for example, may gaze at a particular icon on the display in order to select the icon, and then use the enter button to activate the icon, causing the system to undertake an appropriate operation associated with the icon. Requiring the actuation of a button or other mechanical interface device in order to activate an icon may avoid an icon being inadvertently activated by the user simply looking at the icon, but without intending that the icon be activated.

Using the present system, therefore, the user can utilize his or her gaze to interact with a number of vehicle systems, or electronic systems in communication with the vehicle. For example, the user can use a combination of gaze and/or mechanical user input to adjust settings associated with a climate control system, cruise control systems, or entertainment system, for example. The user can also interact with other electronic systems that are in communication with the vehicle and are configured to receive commands or instructions from the vehicle's computer system. For example, if the user's cell phone or computer system is paired or otherwise connected to the vehicle, the user could interact with that electronic system using the present eye-gaze tracking system. In the case of a cell phone, for example, the user could utilize the present system to select a particular contact for a phone call, or to take another action associated with the cell phone.

In such a system, the IR spectrum camera can be designed to look through various types of eyewear in various lighting conditions so that the camera is able to track the driver's eye position at all times. In some cases, the tracking system is not required to have the same level of precision as home systems, but is able to filter out noise from outside influences. Example filtering techniques may include using bandpass filters for eye tracking data, changing IR filtering and frequencies to move away from interfering IR noise sources, selecting a data frame to look at the user's eyewear and adjusting the focus point for the next data frame (specifically for prescription lens) and changing the IR brightness versus on-time. Additionally, the IR illuminator is used to supplement the camera's visibility by adding additional and consistent IR illumination over the scene to allow the camera to capture images used in tracking a user's eye position.

Conventional eye tracking systems suffer from a number of deficiencies. A normal human eye is constantly moving, even when focused on a particular object. This movement or 'jitter' can make selecting a target icon on a display screen difficult. As the eye moves, the eye gaze control system may register that the eye is flickering back-and-forth, between being directed to the icon and not being directed to the icon. This causes the icon to oscillate between being selected to not being selected. As a result, the jitter may cause the user to be unable to cause a particular target icon to be selected. Conversely, the jitter may result in the user accidentally selecting an unintended target icon.

To minimize these problems, and to otherwise facilitate interactions between a user and an eye gaze detection system, the present system provides for differently sized entrance and exit zones positioned about an icon for selecting and deselecting an icon, respectively. When the user's gaze enters the entrance zone, the icon is selected. Once selected, the user can use a user interface (e.g., button) to activate the icon causing the system to perform an action (e.g., modify a volume of the stereo, or adjust a climate control system). To deselect an icon, the user's gaze must exit the exit zone. In the present system, the entrance zone is smaller than the exit zone. By making the exit zone larger than the entrance zone, the present system ensures that the user both purposefully selects an icon on the screen and purposefully deselects the icon.

This is in contrast to existing systems where only a single selection zone is provided for both selecting and deselecting an icon. When the user's gaze is within the zone, the icon is selected. When the user's gaze is outside of the zone, the icon is deselected. In that configuration, a user's gaze may enter the zone, but then the system may determine that the user's gaze has immediately exited the zone due to jitter. Additionally, in conventional systems that only provide a single selection zone, a user might inadvertently select an icon that they did not mean to.

Figure 2:
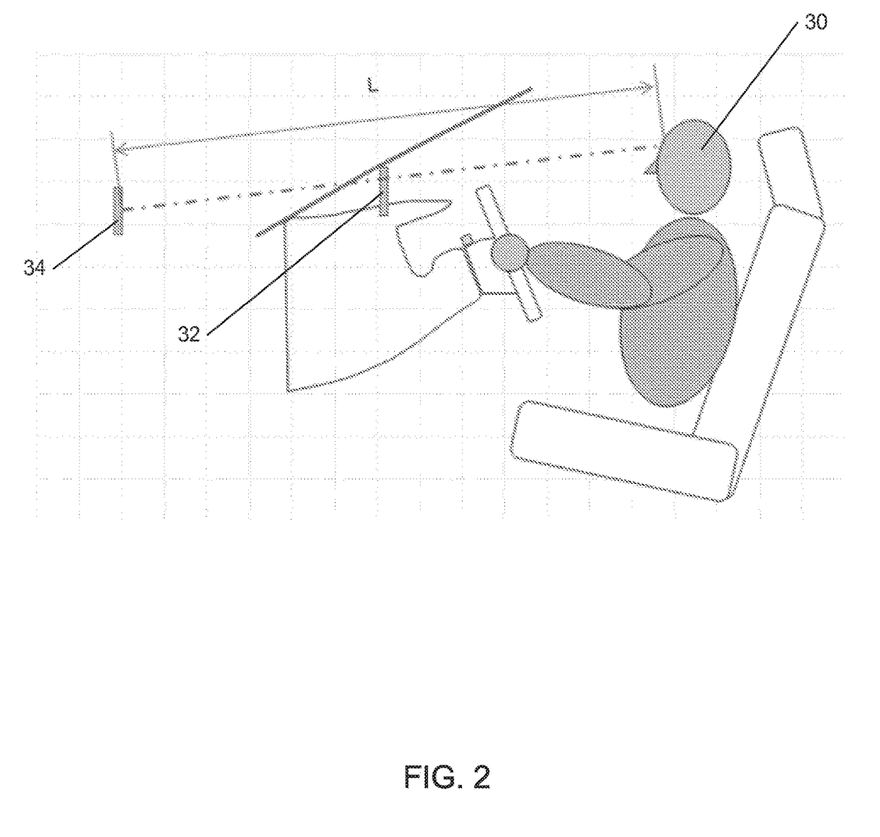
FIG. 2 is an illustration showing an example installation of the present system that uses eye gaze tracking to select icons on a virtual display.

When the present eye gaze system is utilized within the dashboard display of a vehicle, the entrance and exit zones are sized based upon a distance of the display from the driver's eyes. FIG. 2, for example, shows an example use of the present system where the eye gaze tracking is used to select icons on a virtual display. In FIG. 2, driver 30 is seated within a vehicle. A display 32 is positioned in front of driver 30 at the vehicle's dashboard. Display 32 is configured to project an output that includes a display that appears to be located at the position of virtual display 34. Virtual display 34 depicts information for the driver. Virtual display 34 is a distance L away from eyes of driver 30.

In the present system, an eye gaze tracking system is used to track the gaze of driver 30 across virtual display 34. Virtual display 34 includes a number of icons or features that, when gazed upon by the driver, may be interacted with to cause various systems within the vehicle to take certain actions (e.g., controlling a stereo, air conditioning system, and the like). The size of the icons and lettering depicted by virtual display 34, and the size of the icon's or lettering's respective entrance and exit zones are determined by distance L—the distance between virtual display 34 and the driver's eyes.

Note that the present system may be utilized with a convention display system that does not involve displaying a virtual image. In that case, for example, display 32 may display an image that appears to be located at display 32. In that case, the distance between the driver 30 and the display (L) would extend from the driver's eyes to display 32 and not to virtual display 34.

Figure 3:
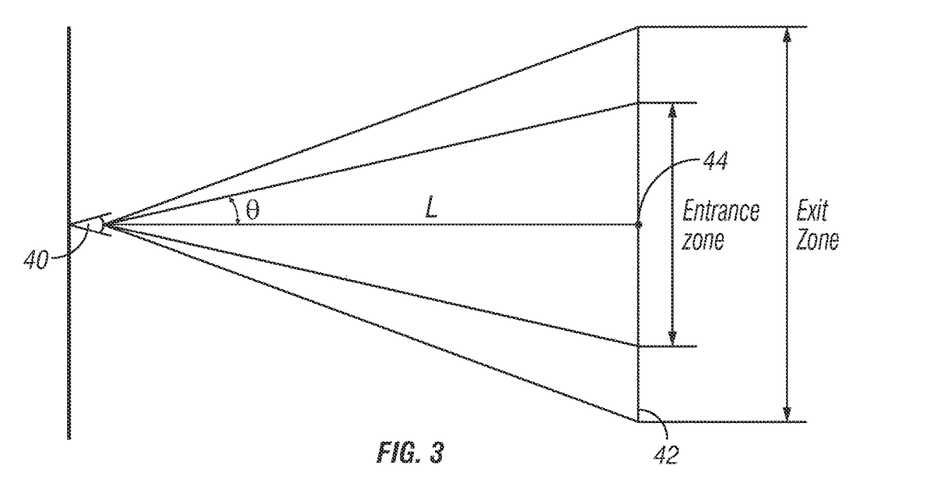
FIG. 3 is a diagram showing an example approach for determining entrance zone size and exit zone size for an icon or text depicted by the virtual display of FIG. 2.

Given the installation shown in FIG. 2, FIG. 3 is a diagram showing one example approach for determining the entrance zone size and exit zone size for an icon or text depicted by virtual display 34. FIG. 3 shows driver's eye 40 positioned in front of the display surface 42 of a virtual display (e.g., virtual display 34 as shown in FIG. 2). Point 44 represents the center of an icon about which the entrance and exits zones are being defined. As shown in FIG. 3, the exit zone is larger than the entrance zone.

Given a particular distance, L, between the driver's eye and the icon, the entrance and exit zone sizes are determined by an accuracy of the gaze detection system. In one implementation, the size of the entrance zone is determined by equation (1).

$$\text{Entrance Zone} = 1.25 \times 2 \times L \times \text{TAN}(\theta) \quad \quad \text{Equation (1)}$$

In equation (1), $\theta$ describes the eye gaze system accuracy when described as a center tolerance value. Accordingly, $\theta$ describes the minimum angle of eye gaze deflection or movement that can be detected by the eye gaze tracking system. L describes the virtual distance of the image displayed by the vehicle's dashboard display (e.g., display 32 of FIG. 2). Equation (1) includes a multiplication factor of 1.25 that is used to increase the size of the calculated entrance zone size. This increase of 25% provides a safety factor that can be used to compensate for system inaccuracies. Other safety factors can be used based upon system implementation.

The size of the entrance zone calculated by equation (1) can be used to determine the size of entrance zones having a number of different shapes. If a circular entrance zone is defined around a particular icon, the entrance zone size calculated in equation (1) may be used to determine the minimum diameter of the circle. If a square entrance zone is defined around a particular icon, the entrance zone size calculated in equation (1) may be used to determine the minimum length of a side of the square. Other shapes may be similarly sized so that no straight line drawn through the center of the entrance zone (whatever the shape of the entrance zone) from edge to edge has a length less than that calculated using equation (1).

Sometimes, a person's eye jitter involves a more pronounced movement of the eye back-and-forth in the horizontal direction than the vertical direction. In that case, two different multiplication factors can be used to determine the minimum horizontal width and vertical height of the entrance zone. For example, if horizontal jitter is more pronounced, a multiplication factor of 1.5 could be used to calculate the minimum horizontal width of the entrance zone, while a multiplication factor of 1.25 is used to determine the minimum height of the entrance zone. In that case, the entrance zone may have an oval or rectangular shape (or any other appropriate shape) where the width of the entrance zone is less than the height of the entrance zone.

The size of the exit zones can be similarly calculated using equation (2) below.

$$\text{Exit Zone} = 1.25 \times (1.25 \times 2 \times L \times \text{TAN}(\theta)) \quad \text{Equation (2)}$$

As an alternative to equation (2), the size of the exit zone may be equal to 1.25 multiplied by the size of the entrance zone.

In equation (2), θ describes the eye gaze system accuracy when described as a center tolerance value. Accordingly, θ describes the minimum angle of eye gaze deflection or movement that can be detected by the eye gaze tracking system. L describes the virtual distance of the image displayed by the vehicle's dashboard display (e.g., display 32 of FIG. 2). Equation (2) includes a first multiplication factor of 1.25 that is used to increase the size of the calculated exit zone size. This increase of 25% provides a safety factor that can be used to compensate for system inaccuracies. Equation (2) includes a second multiplication factor of 1.25 that is used to increase the calculated exit zone size to be 25% greater than the size of the calculated entrance zone. Other safety factors can be used based upon system implementation.

The size of the exit zone calculated by equation (2) can be used to determine the size of exit zones having a number of different shapes. If a circular exit zone is defined around a particular icon, the exit zone size calculated in equation (2) may be used to determine the minimum diameter of the circle. If a square exit zone is defined around a particular icon, the exit zone size calculated in equation (2) may be used to determine the minimum length of a side of the square. Other shapes may be similarly sized so that no straight line drawn through the center of the exit zone (whatever the shape of the entrance zone) from edge to edge has a length less than that calculated using equation (2).

Sometimes, a person's eye jitter involves a more pronounced movement of the eye back-and-forth in the horizontal direction than the vertical direction. In that case, two different multiplication factors can be used to determine the minimum horizontal width and vertical height of the exit zone. For example, because horizontal jitter is more pronounced, a multiplication factor of 1.5 could be used to calculate the minimum horizontal width of the exit zone, while a multiplication factor of 1.25 is used to determine the minimum height of the exit zone. In that case, the exit zone may have an oval or rectangular shape (or any other appropriate shape) where the width of the exit zone is less than the height of the exit zone.

Equations (1) and (2) are only examples of how to calculate the geometry of the entrance and exit zones of the present system. The equations may be modified to include different margins of errors or to increase or decrease the difference in size or area between the entrance zone and exit zone sizes.

In general, the size of the entrance zone can be determined by the accuracy of the eye detection system, with a small built-in buffer (e.g., 25%, as described above). Given a determined size of the entrance zone for a particular icon, the exit zone is then determined to be larger than the entrance zone by a predetermined factor (e.g., 25%, as described above).

Figure 4:
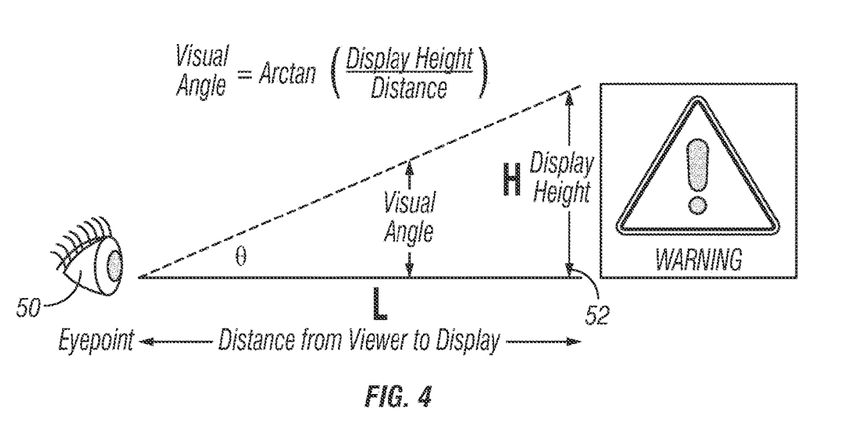
FIG. 4 is a diagram showing an example approach for determining the size of an icon or text on a display.

When sizing the particular icon or lettering on the virtual display (and not the entrance or exit zones), legibility targets for icons and text on a screen can be used. Legibility targets can be expressed as a visual angle and specify a minimum size for an icon or text displayed for a user based upon the distance of the viewer from the icon or text. FIG. 4 is a diagram showing one example approach for determining the size of an icon or text on a display. In FIG. 4, the user's eye 50 is a distance L from display 52. The height of the display icon is H. In that arrangement, the viewer's visual angle (θ) to the icon is determined by equation (3).

$$\theta = \arctan(H/L) \quad \text{Equation (3)}$$

The minimum size of the icons or text displayed on a particular screen, therefore, can be expressed as a minimum visual angle, given a particular distance of the viewer from the display. One automotive standard, for example, recommends a visual angle of 1.43 degrees for an icon (and a minimum visual angle of 0.69 degrees) and a visual angle of 0.4 degrees for text (and a minimum visual angle of 0.27 degrees).

Using the approaches shown in FIGS. 3 and 4, therefore, it is possible to, based upon a particular distance between a display (such as a virtual display) and a driver's eyes, to determine a size of an icon or text on the virtual display, as well as entrance and exit zones for the icon or text.

Figure 5:
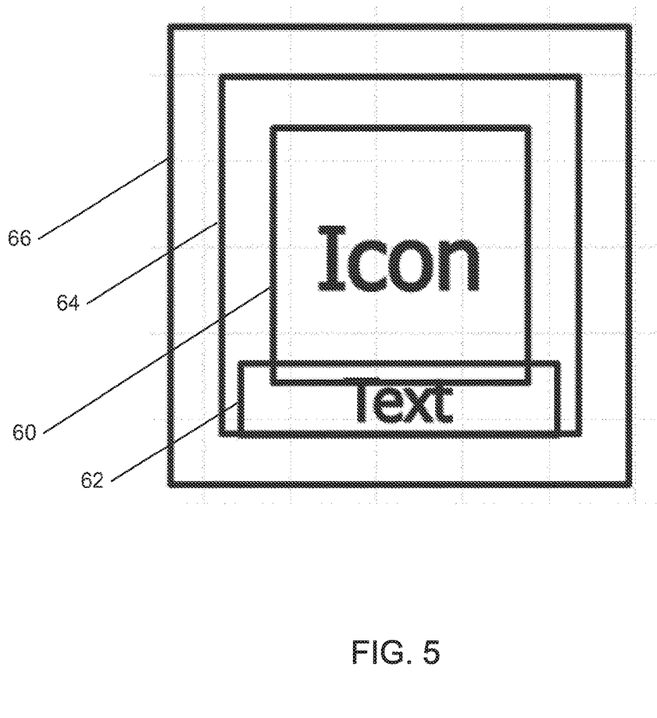
FIG. 5 depicts an example icon and text in addition to entrance and exit zones overlaying the icon and text.

FIG. 5 shows an example icon and text as well as entrance and exit zones overlaying the icon and text that may be used by a display (e.g., visual or virtual display 34 of FIG. 2). As shown in FIG. 5, box 60 represents the size of an icon sized to meet minimum visual angle requirements. Similarly, box 62 represents the size of text associated with the icon and sized to meet minimum visual angle requirements for text.

In addition to the icon and text, entrance and exit zones have been determined for the icon and text. The size of the entrance and exit zones are calculated as described above and are centered over icon 60. As shown in FIG. 5, entrance zone 64 is smaller than exit zone 66, minimizing the problems associated with eye jitter described above.

FIG. 6 is a flowchart showing an example method for controlling the selection and deselection of an icon in accordance with the present disclosure. In step 70, the user's eye gaze is monitored and it is determined that the user's eye gaze has entered the entrance zone surrounding a particular icon (see, for example, entrance zone 64 of FIG. 5). Once the user's gaze has entered the entrance zone, the icon is selected in step 72. The selection of an icon may involve modifying an output of the system's display to indicate to the user that the icon is selected.

Once the icon is selected in step 74, the user may use a button or other user interface to activate the icon causing the system to take an action associated with the icon.

Alternatively, in step 76 it is determined that the user's eye gaze has exited the exit zone associated with the icon (see, for example, exit zone 66 of FIG. 5). Once the user's gaze has exited the exit zone, the icon is deselected in step 78. Again, the deselection of an icon may involve modifying the system's display to provide an indication to the user that the icon is now deselected.

Accordingly, when the eye gaze system determines that the user is looking at a particular icon on the display, the system provides some notification to the user indicating that the icon is selected.

In conventional systems, sometimes that selection is indicated by displaying a border about the selected icon. Unfortunately, in eye gaze systems, this can result in the user inadvertently deselecting the icon. When the border is displayed, the user's eyes naturally move to look at the new border. This movement can cause the system to become uncertain as to whether the user is looking at the icon. Additionally, because the user's eyes may be constantly moving or jittering and the user is now looking at the edge of the icon, the user's focus will periodically move outside of the icon, causing the system to temporarily deselect the icon.

Accordingly, in the present system, when an icon is selected, rather than modify a border about the icon, the system indicates that the icon is selected by modifying an interior portion of the icon. By modifying an interior portion of the icon, the user's focus is actually directed to the center of the icon—providing further confirmation that the user intends to select that particular icon.

Figure 7A:
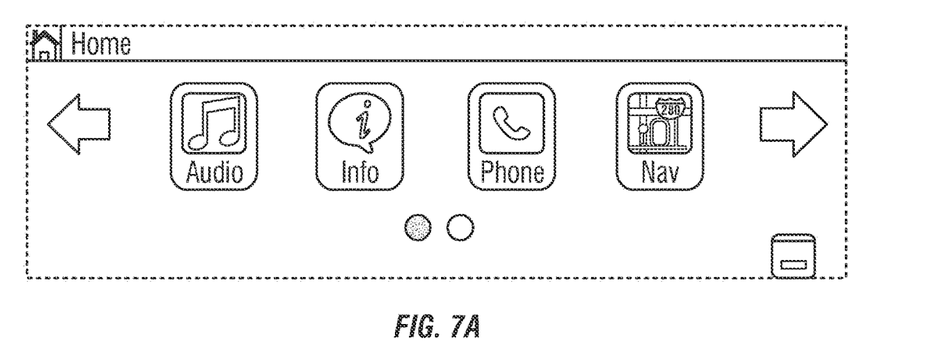
FIG. 7A depicts a number of icons that may be displayed for selection by a user using an eye gaze system.
Figure 7B:
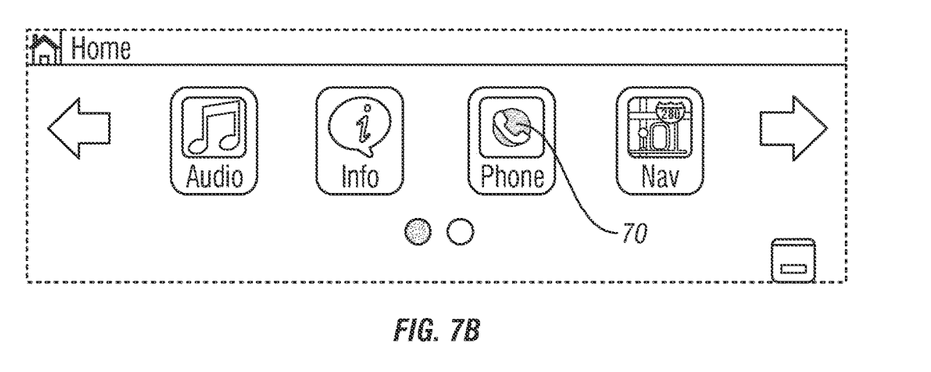
FIG. 7B shows the icons of FIG. 7A where the user has selected the phone icon.

For example, FIG. 7A shows a number of icons that may be displayed for selection by a user using an eye gaze system. FIG. 7B shows the same icons where the user has selected the phone icon by looking at the icon. As shown in FIG. 7B, to indicate that selection, dot 70 is drawn over the icon. Dot 50 provides a notification to the user that the icon is selected and also serves to draw the user's focus to the center of the phone icon. In other implementations, shapes other than dots or circles may be displayed over the selected icon.

Once an icon is selected, the system may provide the user with a number of different user interfaces or controls to activate the icon. In some implementations, an enter key or button is activated once an icon is selected in order to activate the icon. In other implementations, once an icon is selected the user blinks indicating that the icon should be activated. Alternatively, the user may simply gaze at an icon for a sufficiently long duration that the system determines the icon is to be selected.

Figure 8A:
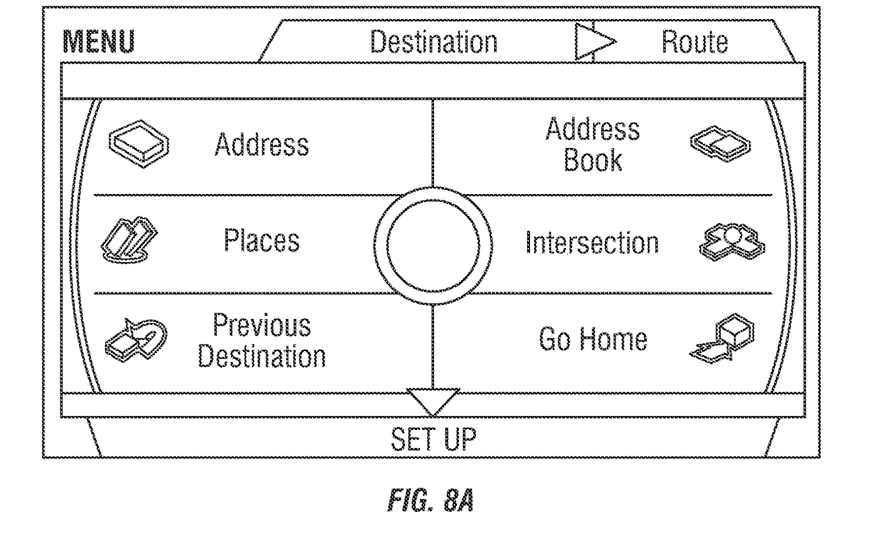
FIGS. 8A-8C depict a number of screens that may be generated by a display of the present eye gaze control system.
Figure 8B:
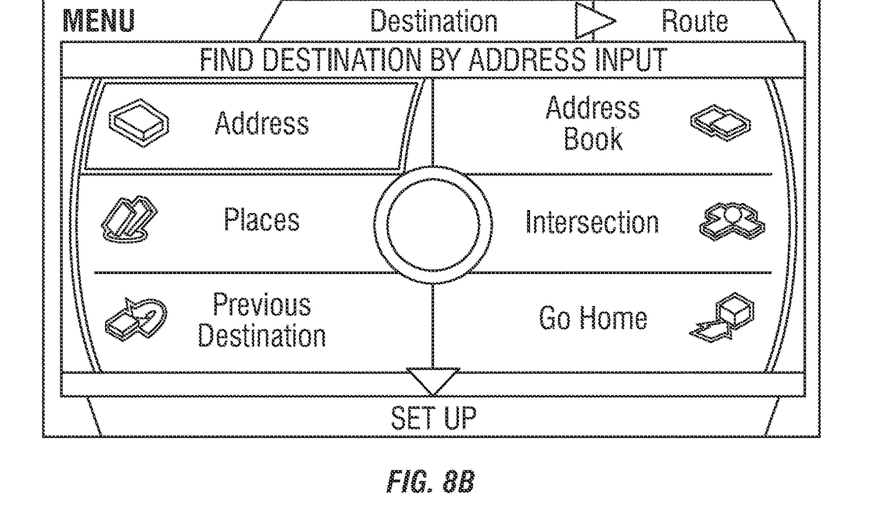

The icon may be associated with any number of electronic systems with the vehicle. The icons, for example, may be utilized to cause menus for controlling different vehicles functions to be displayed. For example, FIG. 8A shows a home screen of a vehicle's navigation system. If the user wishes to access the navigation system's address book, the user first gazes at the address book icon. When the system determines that the user gaze has entered the entrance zone defined around the address icon, the system indicates that the address icon is selected, as shown in FIG. 8B.

Figure 8C:
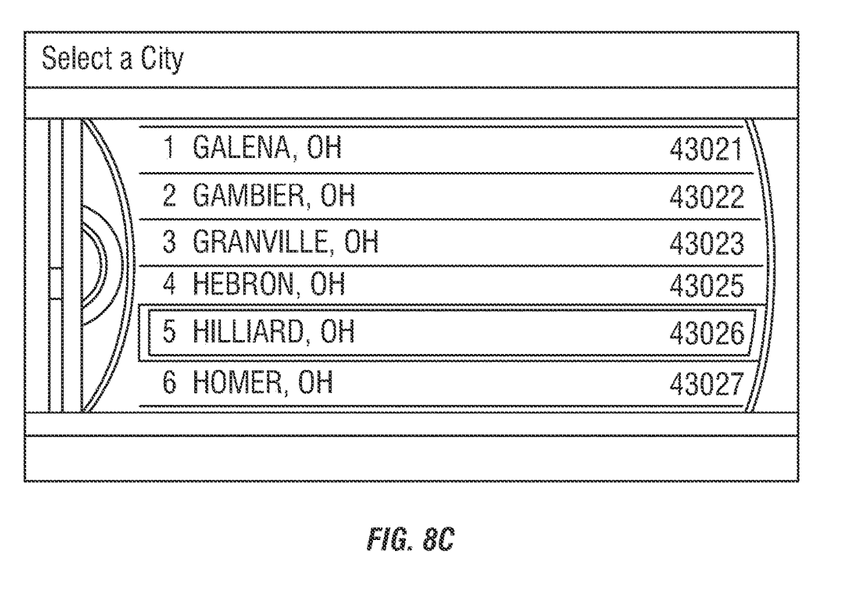

With the address icon selected, the user actuates a user interface (e.g., a steering wheel-mounted button) to activate the address icon. After activating the address book icon, the system displays the contents of the address book, as shown in FIG. 8C.

Alternatively, the system could be used to control a vehicle's stereo. In that case, the display could output a number of icons for controlling power to the stereo, volume, input source, etc.

Although the present invention has been described with respect to preferred embodiment(s), any person skilled in the art will recognize that changes may be made in form and detail, and equivalents may be substituted for elements of the invention without departing from the spirit and scope of the invention. Therefore, it is intended that the invention not be limited to the particular embodiments disclosed for carrying out this invention, but will include all embodiments falling within the scope of the appended claims.

The invention claimed is:

1. A method for controlling an electronic system, comprising:
   displaying an icon,
   the icon being associated with a function of the electronic system and having an entrance zone positioned around the icon and an exit zone positioned around the icon, the exit zone being larger than the entrance zone, wherein a size of the exit zone is larger than a size of the entrance zone by a predetermined factor;
   detecting a location of a gaze of a user using an eye gaze detection system;
   in response to detecting the location of the gaze of the user is within the entrance zone, indicating that the icon is selected;
   in response to detecting the location of the gaze of the user is outside the exit zone, indicating that the icon is deselected; and
   in response to detecting the location of the gaze of the user is within the exit zone, maintaining the icon as selected or deselected.

2. The method of claim 1, wherein displaying the icon includes displaying the icon on a virtual display.

3. The method of claim 1, wherein indicating that the icon is selected includes modifying a region of the icon while leaving a perimeter of the icon unchanged.

4. The method of claim 3, wherein modifying the region of the icon includes modifying a center of the icon.

5. The method of claim 1, wherein a dimension of the entrance zone is at least partially determined by an accuracy of the eye gaze detection system.

6. The method of claim 5, wherein a dimension of the exit zone is at least partially determined by the dimension of the entrance zone.

7. The method of claim 1, wherein the icon includes an image or text.

8. A method for controlling a mobile device, comprising:
   displaying an icon on a display, the icon having an entrance zone positioned around the icon and an exit zone positioned around the icon, wherein a size of the exit zone is larger than a size of the entrance zone by a predetermined factor;
   detecting a location of a gaze of a user upon the display;
   in response to detecting the location of the gaze of the user is within the entrance zone, selecting the icon;

in response to detecting the location of the gaze of the user is outside the exit zone, deselecting the icon; and
in response to detecting the location of the gaze of the user is within the exit zone, maintaining the selecting or deselecting of the icon.

9. The method of claim 8, wherein the display includes a virtual display.

10. The method of claim 8, wherein selecting the icon includes modifying a region of the icon while leaving a perimeter of the icon unchanged.

11. The method of claim 8, wherein a dimension of the entrance zone is at least partially determined by an accuracy of the location of the gaze of the user upon the display.

12. The method of claim 11, wherein a dimension of the exit zone is at least partially determined by the dimension of the entrance zone.

13. The method of claim 8, wherein the mobile device is in communication with an electronic computer system.

14. A system for controlling an electronic system, comprising:
a display configured to display an icon, the icon having an entrance zone positioned around the icon and an exit zone positioned around the icon, the exit zone being larger than the entrance zone;
an eye gaze sensor configured to detect a location of a gaze of a user upon the display; and
a processor connected to the display and the eye gaze sensor, the processor being configured to:
in response to the eye gaze sensor detecting the location of the gaze of the user is within the entrance zone, indicate that the icon is selected,
in response to the eye gaze sensor detecting the location of the gaze of the user is outside the exit zone, indicate that the icon is deselected, and
in response to the eye gaze sensor detecting the location of the gaze of the user is within the exit zone, maintaining the icon as selected or deselected.

15. The system of claim 14, wherein the display includes a virtual display.

16. The system of claim 14, wherein, when the icon is selected, the processor is configured to modify a region including a center of the icon.

17. The system of claim 16, wherein modifying the region including the center of the icon includes displaying a dot over the center of the icon.

18. The system of claim 14, wherein a dimension of the entrance zone is at least partially determined by an accuracy of the eye gaze sensor.

19. The system of claim 18, wherein a dimension of the exit zone is at least partially determined by the dimension of the entrance zone.

20. The system of claim 14, wherein the icon is associated with a function of the electronic system, and further comprising a user interface configured to activate a selected icon and to control the function of the electronic system.

* * * * *